Sept. 5, 1944.                    E. J. HABER                    2,357,734
APPARATUS FOR SEPARATING DUST AND OTHER SUSPENDED
     MATTER FROM AIR AND OTHER GASES OR VAPORS
              Filed March 12, 1942          2 Sheets-Sheet 1
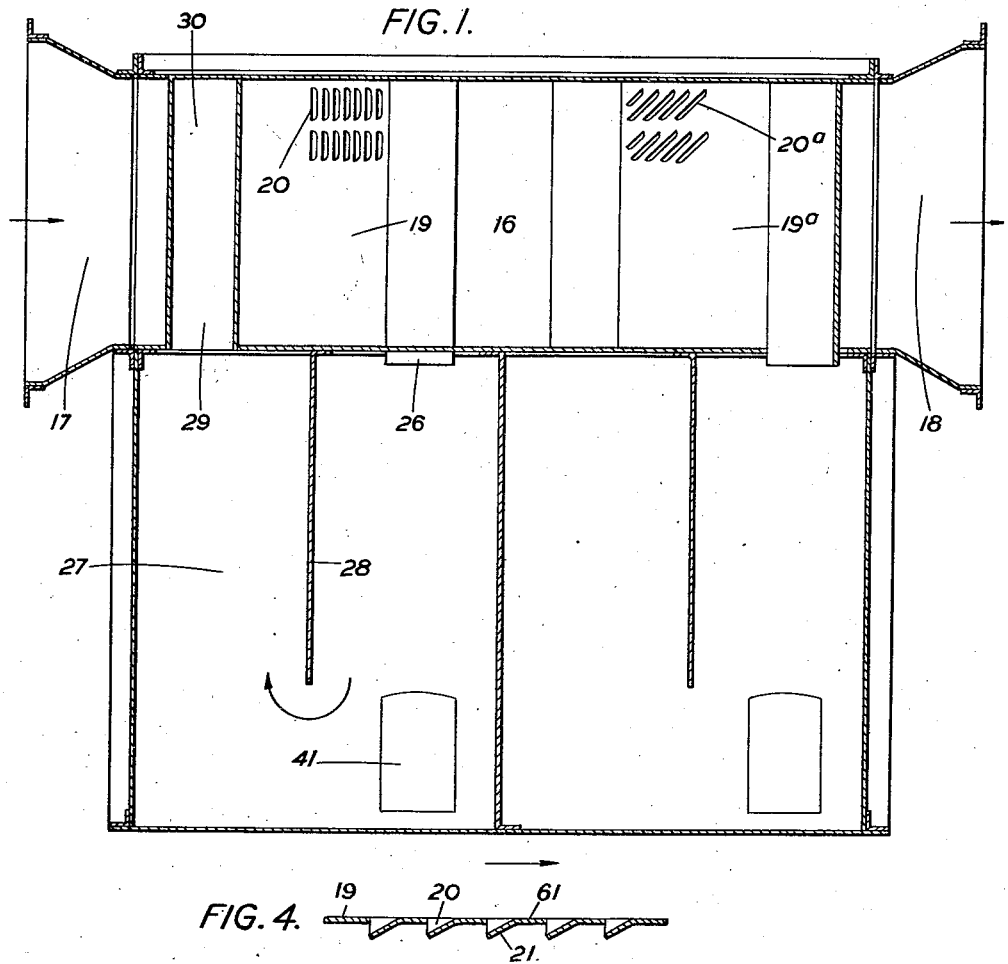
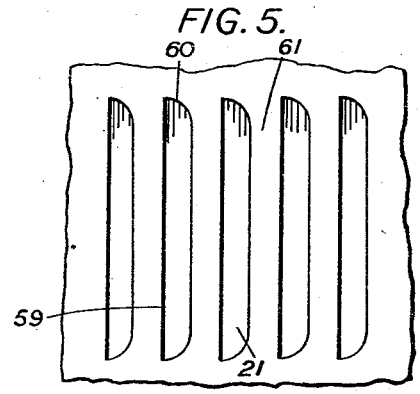
INVENTOR
Eugene Jeno Haber
BY
ATTORNEYS.

Sept. 5, 1944.  E. J. HABER  2,357,734
APPARATUS FOR SEPARATING DUST AND OTHER SUSPENDED
MATTER FROM AIR AND OTHER GASES OR VAPORS
Filed March 12, 1942  2 Sheets-Sheet 2
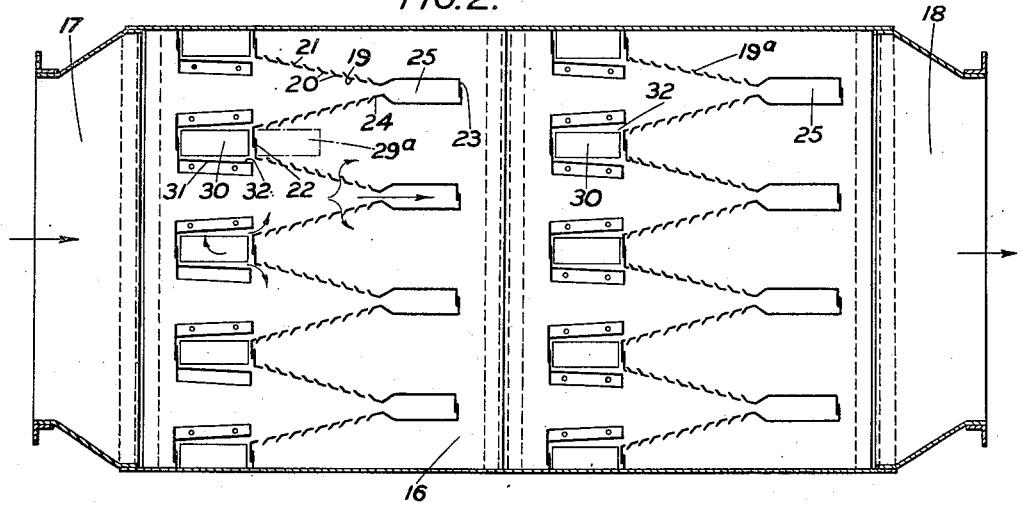
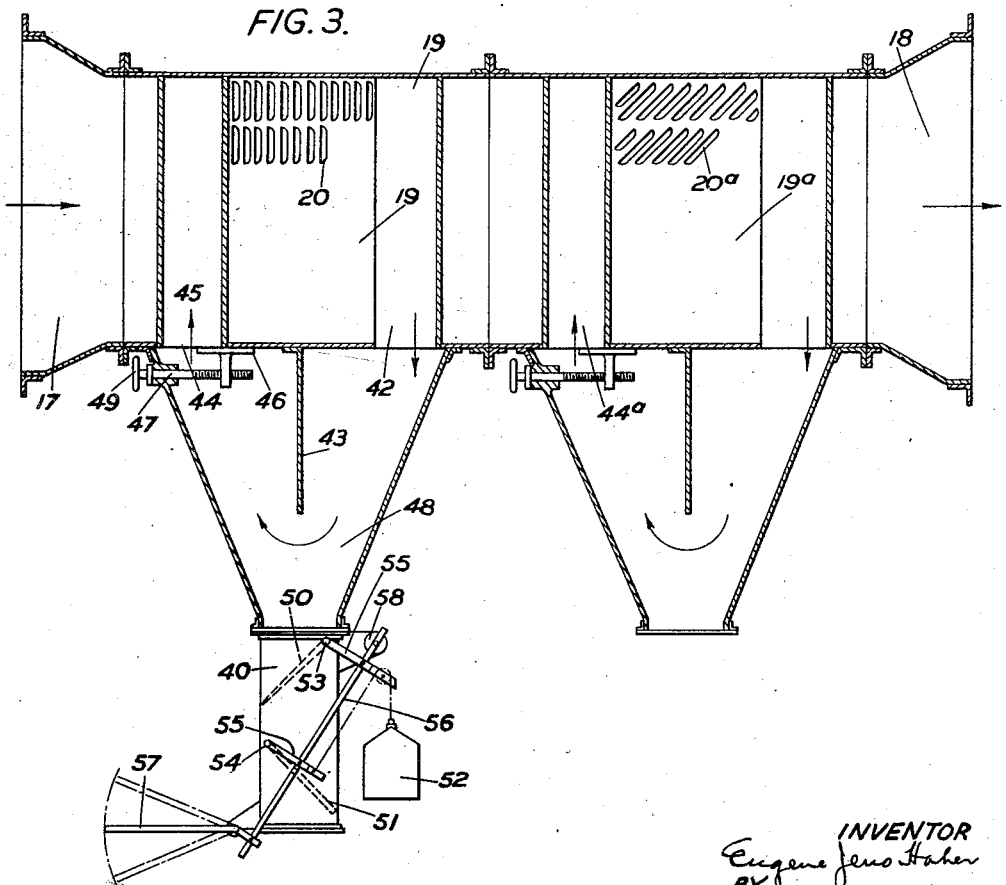
INVENTOR
Eugene Jeno Haber
BY
ATTORNEYS Patented Sept. 5, 1944

2,357,734

UNITED STATES PATENT OFFICE 2,357,734

APPARATUS FOR SEPARATING DUST AND OTHER SUSPENDED MATTER FROM AIR AND OTHER GASES OR VAPORS

Eugene Jeno Haber, Sanderstead, England, assignor to Matthews & Yates Limited, Swinton, Manchester, England, a British company Application March 12, 1942, Serial No. 434,432
In Great Britain August 13, 1940

2 Claims. (Cl. 183—75)

This invention relates to apparatus for separating gases of different densities or for separating suspended matter from air, steam or vapor, for example, for separating dust from air or for separating sulphur and other suspended matter from flue gases and the object of the invention is to provide improvements in the means employed for separating the matter to be removed from the parent stream of gas or vapor in order to increase the efficiency of the apparatus to which the invention is applied and at the same time provide separating means which is capable of easy manufacture.

According to the present invention apparatus for separating gases of different densities or for separating suspended matter from air, steam or other gases or vapor is provided comprising one or more sections, means for connecting said sections for straight line flow of gas or vapor, diaphragms constituted by slotted plates through which the gas or vapor is caused to pass for cleaning or separation arranged in each section between a top and a bottom plate, means for re-circulating part of the gas or vapor through channels under each section, a dust collecting device beneath each section and means for controlling the amount of gas or vapor re-circulated in each section independently.

Reference will now be made to the accompanying drawings which illustrate by way of example apparatus for carrying the invention into effect and in which—

Fig. 1 is a sectional elevation of a separating apparatus,

Fig. 2 is a sectional plan of the apparatus shown in Fig. 1,

Fig. 3 is a sectional elevation of a modified form of the apparatus shown in Fig. 1, Fig. 4 is a sectional elevation showing the method of forming slots in a diaphragm, and Fig. 5 is a view of a fragment of a diaphragm showing the preferred form of the slots.

In the construction shown in Figs. 1 and 2, the separating chamber 16 is of rectilineal form having an inlet 17 and outlet 18, the dust laden air or other gas being caused to pass through the apparatus by means of a fan or impeller (not shown) which is preferably arranged to draw the air or gas through the apparatus.

Within the chamber 16, the partitions or diaphragms consist of a number of elements 19 which are V-shaped in plan and are each provided with a large number of openings 20 with pressed out deflectors 21 formed as hereinafter described. The elements 19 make a close fit against the top and base of the chamber 16 and they are preferably built up from single perforated plates disposed in vertical planes and having flanges 22 and 23 at their forward and rear ends respectively which are arranged to overlap and are joined by welding or riveting.

One of the objects of this construction of the apparatus is that the elements 19 which are normally more subject to wear than the rest of the apparatus can be easily replaced if desired.

At the apex of each V-shaped structure the plates are bent to form a throat 24 leading to a chamber 25 extending throughout the height of the chamber 16 and communicating through an aperture 26 in the base of chamber 16 with a settling or collecting chamber 27 disposed beneath the chamber 16 and containing a baffle 28 against which the air or gas impinges to cause deposit of solid matter which falls into the base of chamber 27. The parent stream of air or gas passes through the apertures 26 and beneath the baffle 28 or baffles as more than one may be employed, and is recirculated by ascending through openings 29 admitting the air or gas, partially freed from its solid content, to a space 30 enclosed by vertical plates 31 extending throughout the height of the chamber 16 mutually inclined in plan to form vertical slots 32 through which the air or gas passes for retreatment between the slotted diaphragms 19. The plates 31 operate to screen the openings 29 from incoming gas or vapor so as not to obstruct the passage thereof but enable the two streams to mix and pass through the diaphragms.

The air or gas which passes through the slots in the diaphragms 19 is subjected to a further action as above described in a second series of diaphragms 19a with accessory components all constructed and arranged as already described. It will be understood that an air or gas cleansing chamber 16 may be arranged to include only one series of such diaphragms or any larger number according to the character of the air gas or vapor to be cleansed. The openings in the diaphragms 19 are preferably in the form of elongated slots each of which may extend at right angles to the direction of motion of the parent stream as shown at 20 in Fig. 1 or which may lie at an acute angle thereto as shown at 20a in Fig. 1. A door 41 may be provided in the base of chamber 27 to enable the separated matter to be removed, or other means may be provided for mechanical ejection of separated matter.

The inlet apertures for the re-circulation of the parent stream of the air or gas after it has passed through the chamber 27 may be placed on the clean gas side of the elements 19 as shown by the broken line positions at 29a in Fig. 2. These openings, if used, are disposed in the positions shown as near to the closed end of the tapered channel as possible in order that the re-circulated gases will offer the minimum obstruction to the passage of gas through the diaphragms.

The modified construction illustrated in Fig. 3 has the same arrangement of diaphragms as Figs. 1 and 2 and in plan is exactly similar to Fig. 2. In Fig. 3, however, the parent stream of gas or vapor passes through openings 42, beneath a baffle 43 and is re-circulated by ascending through openings 44 admitting to a space 45 enclosed by vertical plates arranged similarly to the vertical plates 31 in Figs. 1 and 2, the gas or vapor passing thereafter between the slotted diaphragms for retreatment.

Each opening 44 is adapted to be controlled by an adjustable plate or damper 46 slidable horizontally in guides and adapted to be set to the desired position by means of an adjusting screw 47 which projects through the wall of the setting chamber 48 and is provided with a knob or handle 49 for manual operation.

The settling or collecting chamber 48 tapers downwards to a discharge outlet 40 normally closed by dampers 50 and 51 operable to open against a counter-balance weight 52. This double damper discharge arrangement is provided to prevent ingress of air to the apparatus while dust is being discharged as only one of the dampers can be opened at a time thereby enabling the withdrawal of dust to take place while gas or vapor is under treatment in the settling chamber.

The pivots 53 and 54 of the dampers 50 and 51 are connected externally of the discharge outlet 40 by levers 55 with an operating rod 56 whose lower end is connected to one arm of a pivoted operating handle 57. When this handle is moved to the lower broken line position, the operating rod 56 is moved axially to rock the upper lever 55 in a direction to open the upper damper 50. As this operation tends to force the lower damper 51 against the wall of outlet 40, this damper remains closed. When the handle 57 is moved to the upper broken line position, the operating rod 56 is moved downwardly and the lower damper 51 is opened to allow the dust accumulated within the outlet 40 to be discharged into bags or conveying means. The dampers 50 and 51 may be power operated by means of an eccentric or cam 58 engaging the upper end of the rod 56, said eccentric or cam being motor operated. It is desirable that the amount of gas or vapor re-circulated shall decrease at each succeeding stage of the apparatus and for this reason the opening 44a in the second stage of the apparatus shown in Fig. 3 can be maintained at a smaller size than the opening 44 and if further sections are employed the openings will be arranged to decrease progressively in size towards the main outlet from the apparatus.

As the amount of dust collected decreases in volume after the first section it is ordinarily unnecessary to instal a damper controlled dust discharge arrangement on the later sections as the dust can be removed when the fan is not running.

The invention possesses the advantage that the slotted diaphragms can be positioned in and removed from the apparatus by merely removing the top cover of the chamber 16. These diaphragms being clamped in position without the use of bolts can, therefore, be easily replaced when eroded or otherwise impaired without dismantling the plant as a whole. Furthermore, the sections being identical in construction are interchangeable.

The number of sections employed depends on the nature of the dust, the fineness of it and the cleansing efficiency required but standard components can be employed throughout rendering it a simple matter to add additional sections where required.

Figs. 4 and 5 show in detail the construction of the slots 20 in the partition or diaphragm 19 in which a number of openings 20 which are formed by pressing out portions 21 which act as louvres for deflecting and changing the direction of motion of the gas or vapor to be cleansed or separated which is caused to flow in the direction of the arrow (Fig. 4).

The diaphragm 19 is made of sheet metal and the pressed out portions 21 can be set either at right angles to the diaphragm or at an acute angle thereto as shown in Figs. 1 and 3. These pressed out portions 21 are arranged on the forward edges of the slots 20 in relation to the direction of movement of the dirty gas or vapor so that the gas or vapor which passes through the slots 20 impinges against the portions 21 and is thereby deflected to reverse the direction of motion of the said gas or vapor.

Fig. 5 illustrates the preferred method of forming the slots 20 in the diaphragms, the shape of the portions pressed out from the diaphragm being shown in Fig. 4. In order to prevent the escape of gas or vapor around the pressed out parts at the ends of the slots 20 the material of the diaphragm is slit along one long side only indicated at 59 and not across the ends so that the ends of the pressed out parts form cowl-like portions indicated at 60. By constructing the slots in this manner the surface areas 61 in Figs. 4 and 5 between the openings on the side of the diaphragm facing the parent stream of gas or vapor form parts of a continuous plane surface of the said diaphragm.

As already described the pressed out members 21 cause a reversal of the direction of flow of the gas or vapor impinging against them and owing to the difference of pressure existing between the two sides of the diaphragm the air or gas is thus separated from the parent stream and also from the suspended matter which is carried away by the parent stream to the settling chamber 27 or 48.

I claim:

1. Apparatus for separating suspended matter from air or gas comprising a plurality of alined horizontal casing sections each having an inlet thereto at one end thereof and an outlet therefrom at its other end, the inlet of one section being connected to the outlet of another section, vertical partitions in each of said casing sections extending from top to bottom thereof and forming a separating chamber between them and dividing the inlet of the respective section from the outlet thereof, a dust receiving chamber disposed below each casing section, a vertical conduit connecting each separating chamber with the respective dust receiving chamber, means for re-circulating air or gas from each dust receiving chamber to the respective separating chamber, said partitions having louvred slots therein arranged to cause an abrupt change of direction of flow of the gas or vapor, and means for relatively controlling the amount of air or gas recirculating from the dust receiving chambers to the separating chambers of the respective sections.

2. Separating apparatus according to claim 1, wherein said controlling means causes a decrease in the amount of air or gas re-circulating from the receiving chamber to the separating chamber of a succeeding section relatively to the amount of such re-circulation from the receiving chamber to the separating chamber of a preceding section.

EUGENE JENO HABER.